June 21, 1966  A. P. SCHNYDER  3,256,927

FLOWING FILM SOLUTION EVAPORATION SYSTEM AND PROCESS

Filed Sept. 17, 1963

INVENTOR
Auxilius P. Schnyder
BY Pennie, Edmonds,
Morton, Taylor & Adams
ATTORNEYS United States Patent Office 3,256,927
Patented June 21, 1966

3,256,927
FLOWING FILM SOLUTION EVAPORATION
SYSTEM AND PROCESS
Auxilius P. Schnyder, Bogota, N.J., assignor to Worthington Corporation, Harrison, N.J., a corporation of Delaware
Filed Sept. 17, 1963, Ser. No. 309,445
9 Claims. (Cl. 159—13)

This invention relates to the evaporation of dilute pulping liquors such as the black liquor from the kraft pulping process, or the soda base sulfite process, for the recovery of the chemicals and heat, and provides an improved apparatus and process for these purposes. The invention will be described by way of example and without limitation to the recovery of chemicals from black liquor from the kraft process.

The apparatus of the invention comprises in combination an evaporator for concentrating the spent liquor from a wood pulping operation, means to burn the concentrated liquor to remove the organic material and form a molten smelt, and apparatus for quenching the smelt to facilitate recovering the chemicals. The apparatus of the invention comprises an evaporator having a series of evaporation units each comprising means for holding a pool of solution, a solution-receiving means above the pool, a plurality of upright evaporation tubes extending from the solution-receiving means to the pool, means to regulate the flow of solution from the solution-receiving means downward over the exterior of each evaporation tube of the unit, means for passing solution from one unit to the next of the series, and means for passing hot gases over the evaporation-tubes to evaporate the solution flowing downward thereover.

The evaporation-tubes extend from the solution-receiving means to the pools, and preferably actually extend into the pools. Solution regulating means are provided to flow controlled streams of the solution downward over the evaporation-tubes from the upper ends into the pools. The solution-receiving means preferably comprises a header arranged to flow a part of the solution over evaporation-tubes which return solution to the pool and another part of the solution to the next pool of the series whereby the solution is advanced progressively in the direction of increasing concentration. Means are provided to flow hot gases from the burning of concentrate liquor over the evaporation-tubes, and in its preferred embodiment comprises a series of upright evaporation-tubes arranged to be contacted with the hot gases in countercurrent to the advancing solution, the most concentrated solution being contacted with the hottest and driest gases.

The evaporator of the invention comprises means for confining separated pools of solution into which the evaporation-tubes extend and companion headers above for each pool into which the solution is pumped from its pool. The evaporator accordingly comprises a series of evaporation units each comprising a pool, a header and a plurality of evaporation-tubes over which solution flows from the header to its pool while being contacted with hot gases. The pools may be compartmentalized parts of a large pool subdivided by partitions or separated pool units. Preferably the separate units are arranged so that the individual evaporation tubes are in staggered relation to provide a turbulent or zig-zag flow of gases over the tubes.

The combination of the invention comprises the improved evaporator, means for burning the concentrated spent liquor in a boiler in which heat is recovered and the hot products of combustion are passed through the evaporator and over the solution flowing over the evaporation tubes, and means for quenching the molten smelt resulting from burning the liquor.

These and other novel features of the invention will be better understood after considering the accompanying drawings and the following discussion;

Figure 1:
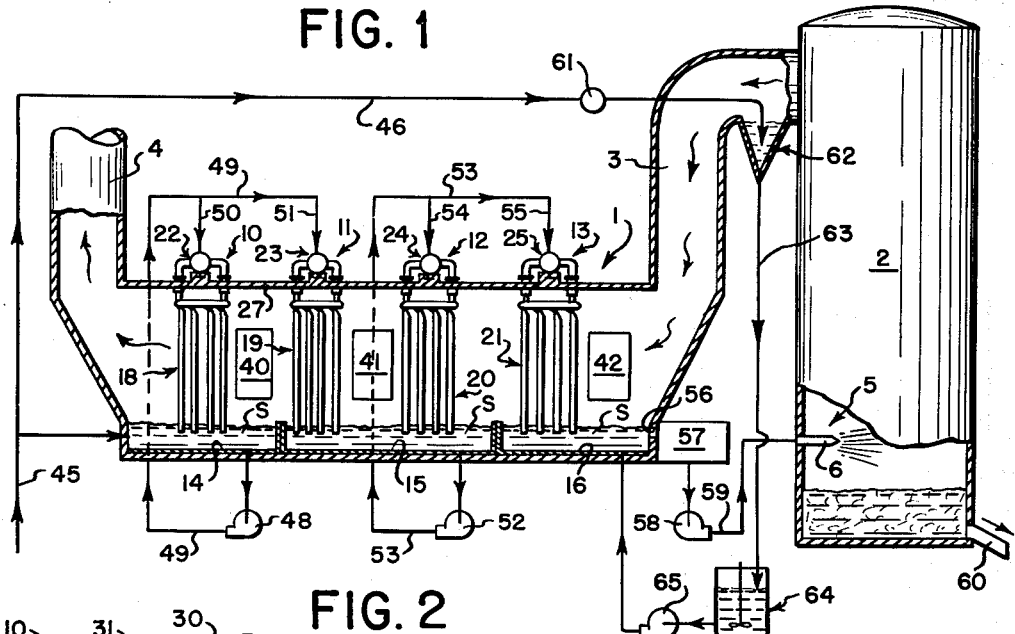
FIG. 1 is a side view with parts in section of a combination of apparatus of the invention.

The apparatus illustrated in the drawings comprises an evaporator 1, a heat-recovering boiler 2, a duct 3 connecting the boiler with the evaporator for the passage of combustion gases from the boiler through the evaporator and then through the discharge stack 4.

The boiler has a combustion chamber 5 in which the concentrated spent black liquor is burned as it is discharged through the nozzle 6. The organic material is burned liberating heat which is recovered in the boiler and the inorganic material, for example, sodium hydroxide, sodium carbonate and sodium sulfide, form a molten smelt which accumulates in the bottom of the boiler and is drawn off and passed into any suitable quenching apparatus (not shown) from which the dispersed solids are recovered.

The evaporator comprises a series of evaporation units 10, 11, 12 and 13 comprising compartments 14, 15 and 16 for pools of solution and a plurality of groups of upright evaporation tubes 18, 19, 20 and 21 and upper solution-receiving receptacles 22, 23, 24 and 25 respectively which are located directly above the compartments.

A transverse I-beam 26 for each receptacle extends across the evaporator for supporting the roof 27 and each of the solution-receiving receptacles.

Figure 2:
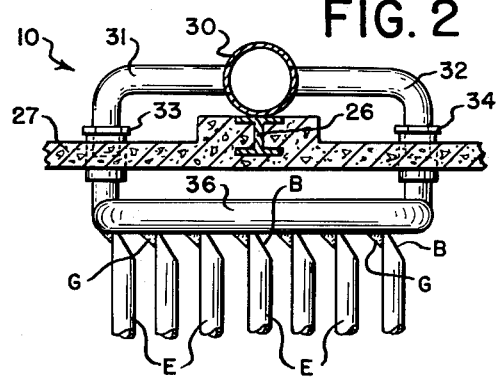
FIG. 2 is an enlarged detail of a portion of FIG. 1.
Figure 4:
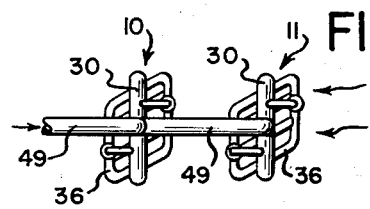
FIG. 4 is a plan view of a group of the solution-receiving units of FIG. 1.
Figure 3:
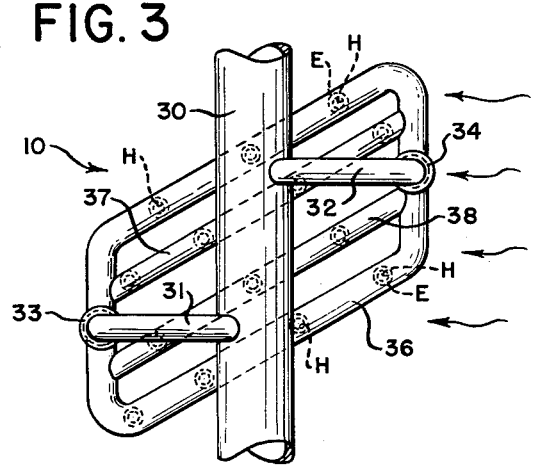
FIG. 3 is a plan view from above of one of the solution-receiving units of FIG. 1.
Figure 5:
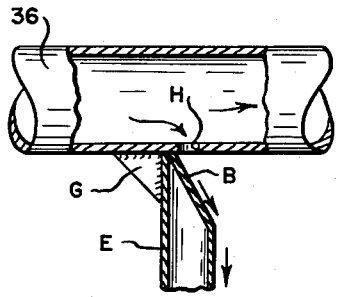
FIG. 5 is an enlarged detail in partial section of a portion of FIG. 2.

As best shown in FIGS. 2 to 4, each solution-receiving receptacle comprises a header pipe 30 supported on the I-beams which header pipe has branch pipes 31 and 32 connected through flanged unions 33 and 34 respectively which make a sealed connection with openings in the roof 27. The pipes 31 and 32 connect to a closed peripheral pipe 36 which, as shown in FIGS. 3 and 4, is angularly disposed and has intermediate cross-pipes 37 and 38. The pipes 36, 37 and 38 have depending evaporation tubes E attached thereto as by welding and the connections are reinforced with the gussets G as best shown in FIG. 5. Each tube E is advantageously formed of pipe and has a tapering top baffle B, located directly below a hole H in the pipe to which it is attached namely, 36, 37 or 38. As shown in FIGS. 3 and 4, the tubes and their holes are in a staggered relation to the gases flowing in the direction of the arrow.

As shown in FIG. 1 the group of tubes 18, 19, 20 and 21 each consisting of tubes E, extend into the pools of solution S in the compartments 14, 15, and 16 respectively. Doors 40, 41 and 42 are provided in the side wall of the evaporator for access to the units of the evaporator.

The solution to be evaporated enters the compartment 14 through pipe 45 and some of the solution is passed through pipe 46 to a header pipe 61 from which the solution flows into the ash-collecting hopper 62. One or more of these hoppers may be used and they preferably extend completely across the duct 3. The ash hoppers 62 are preferably attached directly under the boiler where the down and upflow of the outgoing gases effect a settling of the entrained fine ash before the gases reach or leave the exit from the boiler. The ashes are sluiced through pipe 63 into a separate ash mixing tank 64 wherein the solids are dissolved and the solution is pumped by pump 65 to pool 16. Ordinarily the discharge from the ash tank reaches a concentration equal to that of the main stream of liquor which is cycled through the evaporator. A major part of the solution from pipe 45 enters compartment 14. The solution in compartment 14 is pumped by pump 48 through pipe 49 which is connected by pipes 50 and 51 to the units 22 and 23.

Pump 52 pumps solution through pipe 53 which is connected through pipes 54 and 55 with units 24 and 25. Receptacle 16 has an opening 56 through which concentrated solution flows into the separator 57 from which solids are removed. The concentrated solution is forced by pump 58 through pipe 59 and the nozzle 6 into the combustion chamber of the boiler 2.

A process of the invention is carried out by supplying to pipe 45 a pre-concentrated spent pulping liquor such as kraft black liquor or sulfite liquor containing approximately 50% of solids. The major portion of this liquor is passed into compartment 14 from which it is continuously pumped through pipe 49 and into the header 30. From the header 30 the solution passes through pipes 31, 32 and into pipes 36 and 37. The holes H are proportioned so as to discharge a controlled stream of the solution onto the baffles B which a film of solution of the liquor flows over the evaporation tubes E and the unevaporated solution returns to the pool of solution in the receptacle 14. A part of the solution from pipe 49 enters the header 30 of unit 11 and flows over the evaporation units of that unit as previously described and into the pool of solution in the receptacle 15. As a result of the distribution of the solution between units 10 and 11 there is a progressive advance of solution from receptacle 14 to receptacle 15.

The solution of receptacle 15 is pumped upwardly through pipe 53 and distributed between the evaporator units 12 and 13. In each of these units the solution flows downwardly over the evaporation tubes E as previously described. From unit 12 the liquor is returned to receptacle 15 but the solution evaporated in unit 13 enters the pool of liquor in receptacle 16. The arrangement of units 12 and 13 and their respective receptacle 15 and 16 effect a progressive movement of the solution from receptacle 15 to receptacle 16. The hot combustion gases from the boiler 2 flowing through the duct 3 pass over the evaporation tubes E in the direction of the arrow and in countercurrent relation to the solution advancing progressively from one unit to the other in the evaporator. In the apparatus of the invention, the entire liquor stream is circulated without leaving still pools which would prevent local settling out of solids which would result in some thinning of the liquor.

The concentrated liquor in receptacle 16 is separated from objectionable solid or suspended matter in the unit 57 and is pumped through the pipe 59 and discharged through the combustion nozzle 6 of the waste heat boiler 2. The organic matter is completely consumed and the inorganic matter is converted into a molten smelt which is deposited in the bottom of the boiler. This accumulated molten smelt is discharged through the duct 60 and sent to any suitable means for the recovery of the chemicals.

In the burning of concentrated waste liquor in present equipment there is a tendency for relatively weak liquor to be fed to the burners which will not sustain combustion resulting in blackouts and serious explosions. This appears to be due to the short-circuiting of solution in the evaporators causing weak solution to enter the burners. The apparatus of this invention comprising multi-stage units of evaporation and pumps for the positive flow of liquor from unit to unit practically eliminates short circuiting and pockets of weak liquor or still corners where the liquor can curdle with the dissolved chemicals resulting in the settling out of solids.

I claim:

1. An improved evaporator for solution concentration which comprises a series of evaporation units each comprising means for holding a pool of solution, a solution-receiving means above each pool, a plurality of upright evaporation tubes extending from the solution-receiving means into the pool, means to fix the rate of flow of solution from the solution-receiving means downward over the exterior of each evaporation tube of the unit, means for passing solution from one unit to the next of the series, and means for passing hot gases in a horizontal direction over the evaporation tubes and in direct contact with the solution flowing over the exterior of the tubes to evaporate the solution flowing downward thereover.

2. An improved evaporator as defined in claim 1 in which the means to fix the rate of flow of solution comprises an orifice for each tube to fix the rate of flow of solution from the solution-receiving means, each of said evaporation tubes being cylindrical and having an upper inclined surface over which solution flows from the orifice and is distributed over the evaporation tube surface facing the gas flow.

3. An improved evaporator as defined in claim 1 in which the tubes are in staggered arrangement with regard to the horizontal flow of gas over the tubes, to provide turbulent, zig-zag flow of gases over the tubes.

4. An improved evaporator for solution concentration which comprises means for confining a series of pools of solution in a substantially horizontal closed duct, a solution-receiving means above each pool, means for flowing solution from each pool to its solution-receiving means, a plurality of upright evaporation tubes extending from each solution-receiving means into its corresponding pool, means for flowing, at a fixed rate, a stream of solution from each solution-receiving means downward over the exterior of each corresponding evaporation tube to the pool, means for passing solution from one pool to the solution-receiving means of the next pool to progressively advance the solution from one pool to the next adjacent pool, and means to pass hot gases in a horizontal direction over the evaporation tubes and in direct contact with the solution flowing over the exterior of the tubes and in countercurrent relation to the flow of solution advancing from one pool to the next.

5. An improved evaporator as defined in claim 4 in which the solution-receiving means includes a header with connected pipes having therein a hole for each tube, each of said evaporation tubes being cylindrical and having an upper inclined surface over which solution flows from the hole and is distributed over the evaporation tube surface facing the gas flow, from which it flows into the pools.

6. An evaporator for concentrating solutions which comprises a series of connected units each having a compartment below for a pool of solution, a solution-receiving means above the compartment, pump means for flowing solution from the compartment to the solution-receiving means, a plurality of upright evaporation tubes depending from the solution-receiving means into the pool, means for flowing, at a fixed rate, a stream of solution over each tube from the solution-receiving means into the pool, means for passing some of the solution from each solution-receiving means progressively to the next adjacent unit of the series, means for passing hot gas in a horizontal direction over the solution on the evaporation tubes and in direct contact with the solution flowing over the exterior of the tubes, and in countercurrent to the progressive flow of solution from unit to unit, and means for removing concentrated solution from a unit where the gas enters the evaporator.

7. The combination of apparatus for the evaporating of spent pulping liquors and the burning of the concentrate to recover chemicals and heat which comprises an evaporator for receiving dilute spent liquor consisting of a plurality of upright evaporation tubes, pool means beneath the tubes and means for pumping solution from the pool means to a solution-receiving means above from which solution flows downward over the tubes, means for advancing the solution flow progressively in the direction of increasing solution concentration, furnace means including a heat recovery boiler for burning the organic matter of the concentrated solution and forming a molten smelt of the contained inorganic chemicals, and means for passing hot boiler gases in a horizontal direction over the tubes and in direct contact with the solution flowing over the exterior of the tubes, and in countercurrent to the advancing solution.

8. An improved evaporator as defined in claim 7 in which the means for passing gases comprises a duct connecting the boiler with the evaporator for the flow of combustion gases, an ash-receiving means in the duct, means for passing liquor into the ash-receiving means to sluice it into a mixer wherein the ash is dissolved, and means for passing the solution from the mixer back to the solution in the evaporator.

9. The process for concentrating spent pulping liquor which comprises flowing the liquor into a receptacle to form a pool, flowing liquor from the pool to an evaporation unit from which it flows downward in the form of a multiplicity of sheets and back to the pool, flowing some of the liquor from the pool to another evaporation unit from which the liquor flows in a multiplicity of sheets to another pool in another receptacle, progressively flowing the liquor from one pool and evaporation unit to another in the direction of increasing liquor concentration, burning the concentrated liquor and passing hot combustion gases from the burning of the liquor in countercurrent relation to the flowing liquor and in direct contact with said liquor, and normal to said sheets, to evaporate water from the sheets of liquor.

References Cited by the Examiner

UNITED STATES PATENTS

| | | | |
|---|---|---|---|
| 1,867,076 | 7/1932 | Hughes et al. | 202—174 |
| 1,933,254 | 10/1933 | Goodell | 23—48 |
| 2,385,955 | 10/1945 | Tomlinson | 23—131 |
| 2,524,753 | 10/1950 | Betts | 23—48 |
| 2,672,926 | 3/1954 | Cross | 159—13 |
| 2,702,235 | 2/1955 | Hochmuth | 159—29 X |
| 2,891,843 | 6/1959 | Moxness | 23—48 |
| 2,936,215 | 5/1960 | Hochmuth | 23—48 |
| 3,004,590 | 10/1961 | Rosenblad | 159—13 |
| 3,159,609 | 10/1964 | Markant et al. | 23—277 X |

FOREIGN PATENTS 9,572    1905    Great Britain.

NORMAN YUDKOFF, Primary Examiner.

J. SOFER, Assistant Examiner.